Nov. 16, 1965 S. A. DOUGLAS 3,217,391
METHOD OF TAPPING AN ASSEMBLED POTENTIOMETER
Original Filed Nov. 5, 1958 2 Sheets-Sheet 1
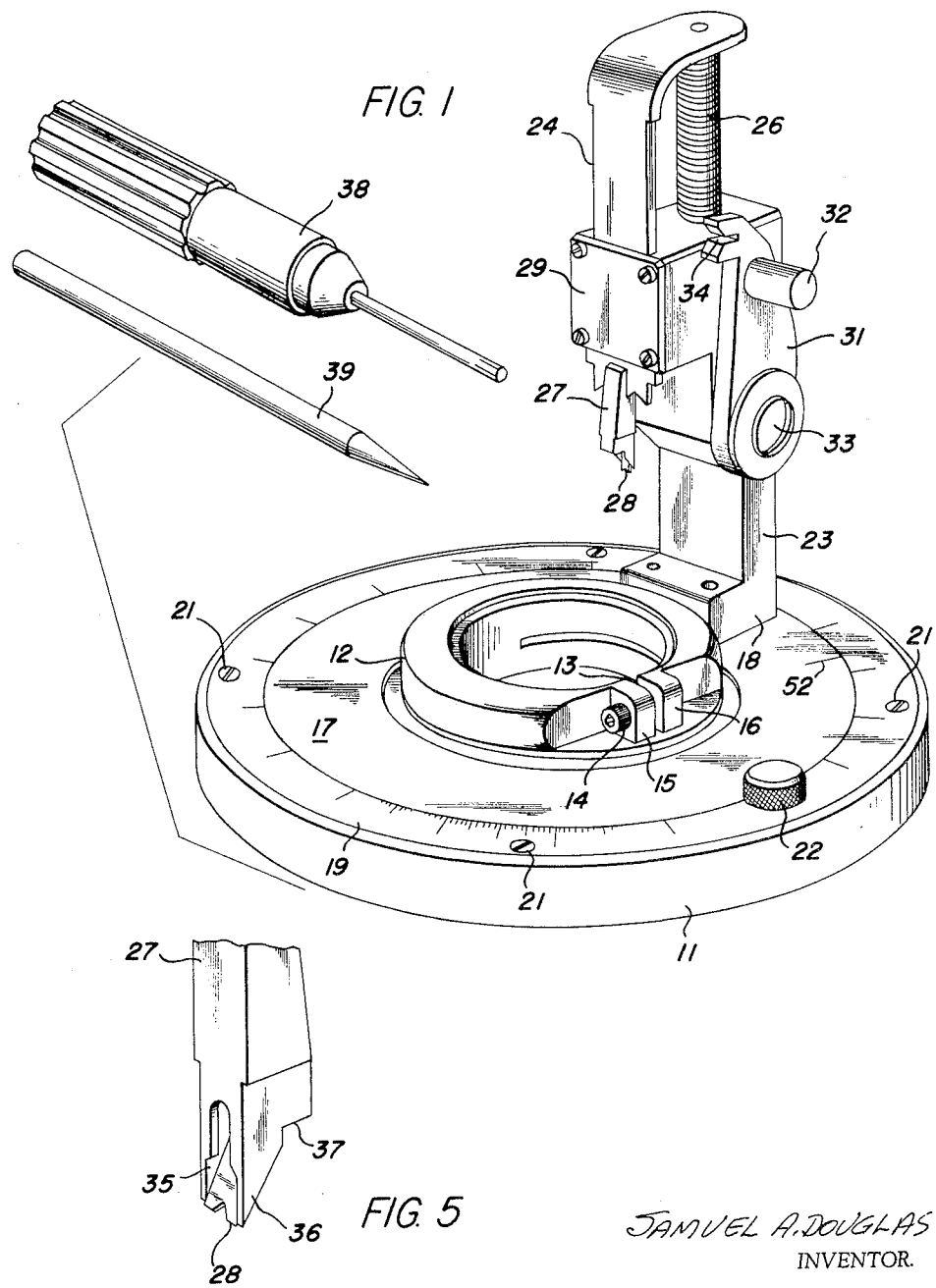
SAMUEL A. DOUGLAS
INVENTOR.
BY Frederick J. Smyth Nov. 16, 1965  S. A. DOUGLAS  3,217,391
METHOD OF TAPPING AN ASSEMBLED POTENTIOMETER
Original Filed Nov. 5, 1958  2 Sheets-Sheet 2
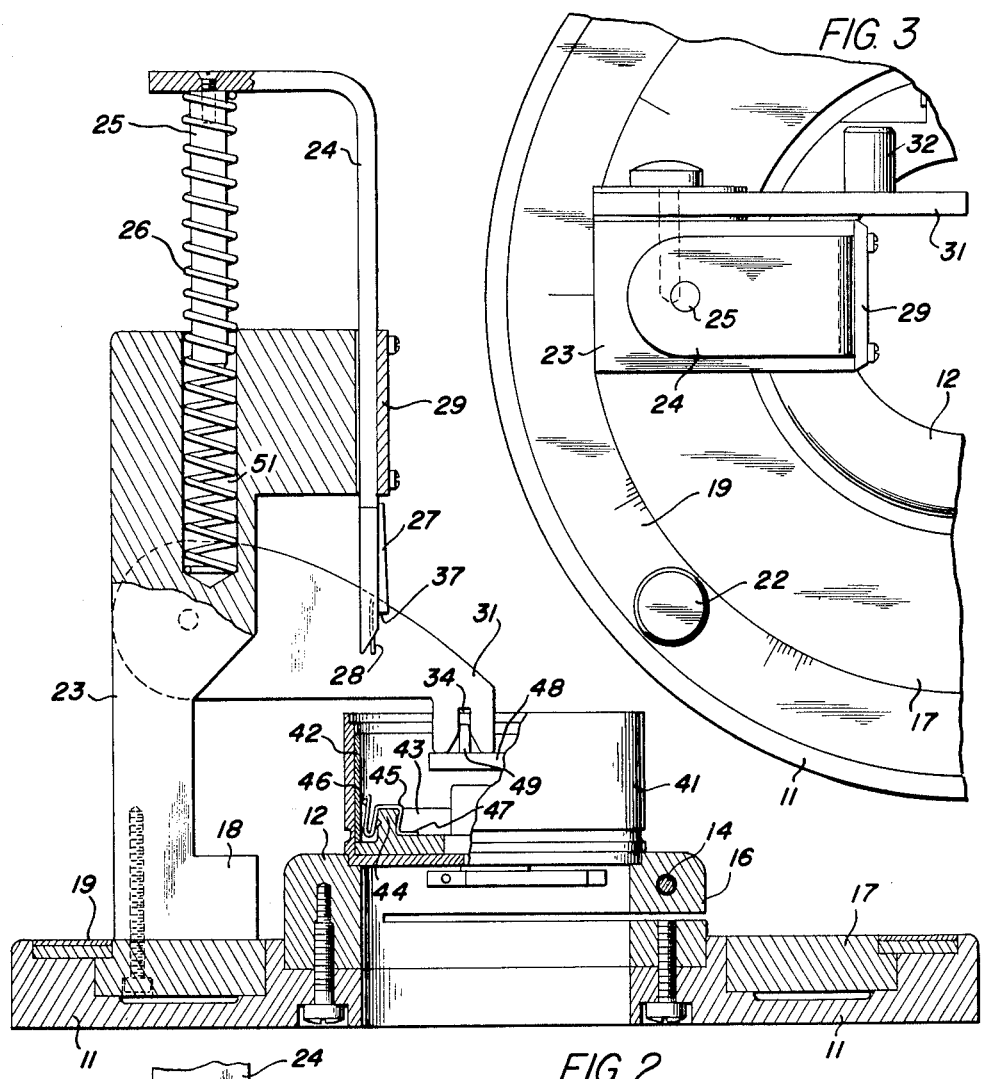
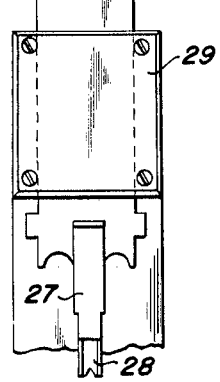
SAMUEL A. DOUGLAS
INVENTOR.
BY

United States Patent Office 3,217,391
Patented Nov. 16, 1965

3,217,391
METHOD OF TAPPING AN ASSEMBLED POTENTIOMETER
Samuel A. Douglas, Endicott, N.Y., assignor to General Precision, Inc., Binghamton, N.Y., a corporation of Delaware
Original application Nov. 5, 1958, Ser. No. 772,073, now Patent No. 3,085,321, dated Apr. 16, 1963. Divided and this application Oct. 10, 1962, Ser. No. 229,697
2 Claims. (Cl. 29—155.71)

This invention relates to methods of assembling electrical appliances, and, more particularly, to a method of applying taps to assembled potentiometers. This application is a division of co-pending application Serial No. 772,073, filed November 5, 1958, now Patent No. 3,085,321.

Resistors, both fixed and variable, are well known electrical components which have been in use almost as long as electricity itself has been utilized. Originally resistors were fashioned haphazardly from any substance which would produce the desired effect, and their use was primarily for rough adjustment of the current flow or potential in a circuit. As the science of electricity developed, so did the need for more accurate resistors and for more effective and improved methods of manufacturing them.

As new resistor compositions were developed, they were used for variable as well as fixed resistors, for the uses of components in which the resistance could be varied over a range of values were growing. However, it was not until the use of analog computers for both training and control became widespread that the demand for potentiometers of great accuracy and precision grew to great proportions. With the present emphasis upon electrical and electronic training aids and control systems for operating everything from garage doors to guided missiles, the use of potentiometers has become great. And the potentiometers required for modern appliances must be precision instruments.

Since the growth of resistors has been of both the fixed and the variable types, it has become evident that the combining of both functions in a single device would greatly increase its versatility and aid in the reduction in the size and complexity of circuits in which it was used. This is especially true of large machines such as modern aircraft training systems. The simulation on the ground of the operations of the multitude of parts in an aircraft in response to actions of a pilot trainee requires analogue computers which utilize large numbers of both fixed and variable resistors. For accurate and lifelike simulation, precision components must be used, and the cost of such equipment, as well as the space required thereby, is great.

In an effort to overcome these problems, potentiometers of high accuracy have been developed. These potentiometers are designed to be stacked and to operate in ganged groups to standardize their production and so reduce the cost of manufacture and the space requirements. In addition, taps can be applied to the potentiometers to provide fixed resistance values and eliminate the need for many fixed resistors. However, the taps must be applied to the potentiometer with an accuracy of the same order as that of the original potentiometer, and the taps should be capable of rapid and simple replacement by equipment that can be easily used in the field as well as in the manufacturing plant. By such means, the number of different resistors required by many installations can be materially reduced, reducing the size of inventories and of necessary storage space. Also, resistance values could then be changed without expensive dismantling of complex equipment and the replacement of expensive parts.

It is an object of this invention to provide a new and improved method of applying taps to electrical appliances.

It is another object of this invention to provide a new and improved method of using portable machine for rapidly and accurately applying taps to variable resistor elements.

It is a further object of this invention to provide a new and improved method of using an apparatus for applying removably positioned taps to potentiometers and for electrically checking the positioning of the taps so applied.

Further objects and advantages of this invention will become apparent as the following description proceeds, which description should be taken in conjunction with the accompanying drawings, in which:

FIG. 1 illustrates, in perspective, the device of this invention;
FIG. 2 is a sectional view of the apparatus illustrated in FIG. 1;
FIG. 3 is a plan view of a portion of the device shown in FIG. 1;
FIG. 4 is an elevational view of a portion of the device of FIG. 1 shown enlarged; and
FIG. 5 is a perspective view of portions of the device illustrated in FIG. 4.

Referring now to the drawings in detail, the reference character 11 designates a generally circular base which supports a centrally split ring portion 12 adapted to carry a potentiometer 41 to which taps are to be applied. The ring 12 is split at one side 13, and the portions on either side of the split 13 comprise legs 15 and 16 through which is threaded a clamping set screw 14. An annular portion 17 is supported by the base 11 for rotation in a depression formed therein. A base portion 18 of an upright support member 23 is mounted on the annular portion 17, and the annular portion 17 is surrounded by a ring-shaped scale member 19 which is affixed to the base 11 by means of screws 21. A knurl headed screw 22 is threaded into the base 11 through the scale 19 for clamping the ring portion 17 into any fixed position.

The upright support member 23 carries on its upper portion an L-shaped lever arm 24 having a cylindrical plunger member 25 fastened to its upper horizontal portion. Surrounding the cylindrical plunger 25 is a coil spring 26 so arranged as to maintain the lever arm 24 in a raised position. The lower end of the vertical portion of the lever arm 24 carries a tap setting member 27 having a spring portion 28 therein. The lever arm and the tap carrying assembly are supported in an appropriate groove in the support member 23 and are contained therein by a face plate 29 removably attached thereto. An arm 31 having a cylindrical handle portion 32 is rotatably supported on one side of the base member 23 by means of a pivot screw 33. The extreme end of the arm 31 has a notch 34 fashioned therein with divergent outer portions for receiving the pin projection of a potentiometer wiper arm. A wrench 38 is used for adjusting the clamping set screw 14 to fixedly attach or remove a potentiometer 41 to the apparatus, and a wooden cylinder 39 having a tapered end portion is used to adjust or remove the taps from the potentiometer.

As shown more clearly in the enlarged view of FIG. 5, the end portion 27 of the lever 24 comprises a hollow body portion 36 which tapers outwardly and upwardly from a knife edge to a shoulder portion 37. The inner vertical surface of the body 36 has a keyhole slot 35 cut therein through which a portion of the spring member 28 can be seen. Shown in FIG. 2 is the potentiometer comprising a housing 41 having a resistance element 42 mounted therein about the inside circumference of the housing. The base member 43 of the potentiometer has an upwardly projecting portion 44 about which is the U-shaped portion 45 of a fixed tap. At one end of the fixed tap adjacent the resistance element 42 is a sharp, pointed contact element 46, and a connecting wire (not shown) is fastened to the opposite end 47 of the tap. Mounted on a shaft (not shown in FIG. 2) which passes through the housing 41 is a wiper arm 48 which carries the sliding contact elements of the potentiometer. Also carried by the potentiometer housing 41, although not shown herein, is a device to which the individual fixed tap and the contact elements of the potentiometer may be connected for connection to external devices. The pin 49, at one end of the contact arm 48, is shown in FIG. 2 in operative relation to the notch 34 in the end of the arm 31. Also shown in FIG. 2 is the manner in which the cylindrical plunger is attached to the arm 24 and in which the coil spring 26 surrounds the cylindrical plunger 25 and is inserted in a cylindrical opening 51 in the upright support 23.

In operation, the potentiometer housing 41 is mounted in the split ring 12 such that, with the index 52 on the annular portion 17 at the zero position, one end of the resistant element 42 of the potentiometer is directly under the V-notch in the spring member 28. In this position the clamping set screw 14 is rotated by means of the wrench 38 to lock the potentiometer into position. The knurled screw 22 is released so that the annular portion 17, the upright support 23 and the associated elements carried thereby may be rotated with respect to the potentiometer 41 and with the scale 19. A tap is then inserted between the spring member 28 and the back portion of the nose portion 36, with the pointed contact element 46 in the keyhole slot 35. The spring 28 releasably holds the tap in position against the back wall of the nose portion 36. The annular portion 17, together with the upright support 23, is then rotated until the index 52 indicates the angular position at which a tap is to be inserted in the potentiometer, and the knurled headed screw 22 is hand tightened to hold the rotating portion in that position. The upper portion of the lever arm 24 is then depressed against the action of the spring 25 to force the tap into the potentiometer housing so that the U-shaped portion 45 of the tap resiliently clamps around the projection 44 within the housing. The pointed contact element 46 then makes contact with the resistance element 42. When the lever arm 24 is released, it springs back into its uppermost position and the spring member 28 releases the tap so that it remains in the potentiometer housing.

Additional taps may be readily inserted by releasing the locking screw 22 and rotating the annular portion 17 and the upright support 23 to a new position as indicated by the index mark 52. A second tap may then be inserted between the spring 28 and the nose portion 36 and inserted into the proper position in the potentiometer 41. The scale 19 is calibrated in one degree markings and is positioned around the outer periphery of the base 11 to provide greater accuracy in setting. It is possible to set a removable tap within one degree of the desired position in a potentiometer.

To ensure that the tap has been located in the position in which it is supposed to be, it may now be checked by the same device which applied the tap initially used in conjunction with a resistance measuring instrument. With the potentiometer 41 still clamped in its initial zero position, the rotatable contact arm 48 of the potentiometer is rotated until the pin portion 49 is directly under the notch 34 in the arm 31. The arm 31 is then rotated about the axis provided by the screw 33 to engage the pin 49. The lock screw 22 is released and the annular portion 17 and the upright support member 23 are rotated until the index mark 42 indicates the position at which the initial tap was applied to the potentiometer. Resistance readings are then made between the end of the potentiometer and the lead from that particular tap, and, if necessary, the tap is moved slightly by means of the tapered wooden cylinder 39 until a null reading is indicated by the meter. This procedure is repeated for each tap so applied to the potentiometer until all of the taps have been situated accurately within the potentiometer. By this means it is possible to adjust the electrical positions of the taps slightly at any time to compensate for manufacturing variations and maintain with precision relative resistance values between the ends of the resistance element 42 and the fixed taps 46.

Since the tap elements are held into position by the friction exerted against the projecting portion 44 of the potentiometer housing and the U-shaped portion 45 of the tap itself, the taps may be readily removed by prying loose with the tapered cylindrical member 39 for emplacement in a different location or for adjustment purposes. In this manner the necessary inventory which must be carried by a laboratory or other such organization which may require periodically changing resistance elements may be greatly reduced. The potentiometer 41 may be standardized and produced with great accuracy in large numbers and in a wide variety of sizes, and the application of the taps accurately by the device illustrated and described herein may produce an infinite number of changeable resistance relationships to produce versatile equipment.

This specification has described a new and effective device for rapidly and easily removably applying fixed taps to potentiometers and other such portable electrical appliances. Since this description may suggest to those skilled in the art other forms which this invention may take, it is intended that this invention be limited only by the scope of the appended claims.

What is claimed is:

1. The method of applying a tap of predetermined shape to an assembled potentiometer of the type which comprise a housing having a resistance element mounted therein about the inside circumference thereof and a tap-supporting rail member substantially concentric with said resistance element over which said shaped tap is adapted to be clampingly engaged and the end of said tap remote from said rail member engaging said resistance element when said tap is clampingly disposed over said rail member comprising the steps of, rigidly securing said potentiometer in a first plane with one end of said resistance element in alignment with a reference marker and the axis of said potentiometer being normal to said first plane, positioning said tap in yielding rotatable spaced relationship in a second plane parallel with said first plane with said tap also in alignment with said reference marker and the rotational radius thereof being selected to maintain said tap always above said tap-supporting rail member independent of the degree of rotation of said tap, determining in accordance with the resistive variation of said resistance element the precise desired location of said tap in terms of angular displacement from said reference marker, angularly displacing said tap within said second plane in accordance with said determination, causing said tap to simultaneously engage said rail member and said resistance element, and finally clamping said tap to said rail member at said precise desired location to maintain said engagement.

2. The method of claim 1 wherein said simultaneously engaging step further includes the step of vernierly adjusting the total angular displacement of said tap.

References Cited by the Examiner

UNITED STATES PATENTS

| | | | |
|---|---|---|---|
| 2,570,163 | 10/1951 | Scott et al. | 338—323 |
| 2,806,928 | 9/1957 | Woods et al. | 338—323 |
| 2,901,719 | 8/1959 | Smith | 338—137 |
| 2,916,716 | 12/1959 | Streeter | 338—137 |
| 2,926,321 | 2/1960 | Stein et al. | 338—137 |

WHITMORE A. WILTZ, *Primary Examiner.*

JOHN F. CAMPBELL, *Examiner.*